Nov. 19, 1929.  A. S. RICHARDSON  1,736,624
HAND FISHING NET
Filed May 29, 1928
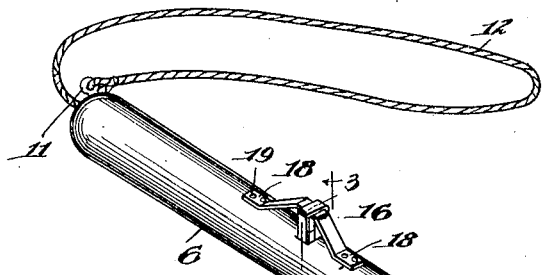
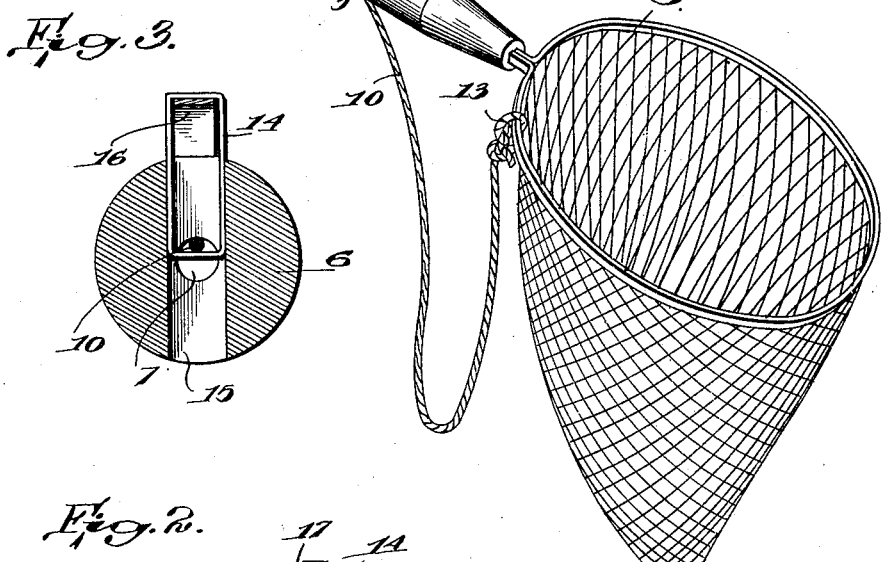
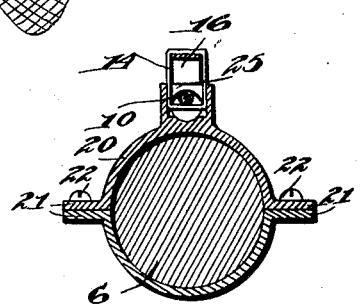
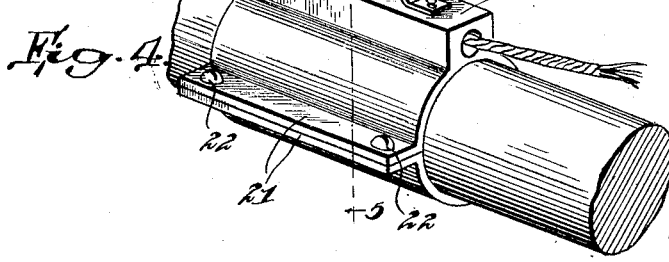
INVENTOR
A.S. RICHARDSON
BY
ATTORNEY Patented Nov. 19, 1929

1,736,624

UNITED STATES PATENT OFFICE

ALLAN S. RICHARDSON, OF BUTTE, MONTANA

HAND FISHING NET

Application filed May 29, 1928. Serial No. 281,494.

My invention relates to hand fishing nets and more particularly to those employed for landing fish after they have become caught and drawn in close proximity to the fisherman.

Fishing nets of this character are usually supported from a loop embracing the shoulder of the fisherman. These loops of necessity must be of such length to permit the net to drag and consequently catch in brush or other obstacles while the fisherman is walking from one point to another. With this objection in mind, it is the principal object of my invention to provide a hand net equipped with an adjustable loop which may be readily adjusted to support the net at such height as to obviate its entanglement with obstacles on the ground or water level.

Further the invention provides manually releasable means for retaining a flexible element which constitutes the suspension loop in adjusted positions.

With the preceding and other objects and advantages in mind, the invention consists in the novel combination of elements, constructions and arrangement of parts to be hereinafter specifically referred to, claimed and illustrated in the accompanying drawings, wherein:

Figure 1 is a perspective of a hand fishing net embodying my invention,

Figure 2 is a fragmentary longitudinal sectional view taken through the handle of the net, Figure 3 is a transverse section taken on line 3—3 of Figure 1, Figure 4 is a perspective of a modification of the invention, and Figure 5 is a transverse sectional view of the same taken on line 5—5 of Figure 4.

Referring to the embodiment of the invention disclosed in Figures 1 to 3 inclusive, a conventional dip net 5 having a rearwardly extending handle 6 is provided. The handle 6 is formed with a central longitudinal bore 7 extending from the rear end thereof to a point adjacent the forward end of the handle where it communicates with an obliquely disposed branch bore 8 that opens upon the periphery of the handle.

A flexible element 10 passes loosely through the bores 7 and 8 and has one end attached to an eye 11, engaged with the rear end of the handle, to produce a body embracing loop 12, which in practice will embrace one shoulder of the human body and pass beneath the human arm at the opposite side of the body. From the branch bore 8 the flexible element extends to the dip net and is tied, or otherwise secured thereto, as at 13.

Normally there is considerable slack in the flexible element between the dip net and its handle, so that when the loop is in operative position the dip net may be held at arms length when it is desired to use the same. In order to hold the flexible element so that this slack or play will be maintained and thus cause the dip net to be supported at a considerable height above the ground or water level, a manually operable open rectangular gripping element 14 is provided, and is longitudinally slidable in a transverse opening 15 formed in the handle and intersecting the bore 7 at a point adjacent its forward end. To normally urge the gripping element in a direction where the flexible element will be bound between one end thereof and the opposed walls of the bore 7, as particularly illustrated in Figures 2 and 3, a leaf spring 16 passes transversely through the outer end of the gripping element 14 and bears against the under face thereof. The leaf spring is of substantially inverted V-shaped formation, but has a flat apex 17 for contact with the gripping element. At its ends the leaf spring is provided with oppositely extending lateral extensions 18 which are secured to the handle by fastenings 19, the extensions being transversely bowed to conform to the contour of the handle.

The modification of the invention disclosed in Figures 4 and 5 is constructed as an attachment for association with the handle of the usual dip net. With this construction a pair of complementary semi-circular clamping members 20 are arranged in opposed relation on the handle and are provided with laterally extending flanges 21 at opposite sides which are arranged in abutting relation and are detachably connected by removable fastenings 22. One of the clamping members is formed with a longitudinally extending rectangular enlargement 23 having a longitudinal bore 24 passing entirely therethrough for the reception of the flexible element 10. In this instance the gripping element 14 operates in a transverse opening provided in the enlargement and communicates with the longitudinal bore. As in the case of the above set forth embodiment of the invention, the gripping element 14 of the modification is normally urged outwardly to grip the flexible element through the medium of a leaf spring 16 which is secured to the upper face of the enlargement 23.

With both embodiments of the invention the gripping element is depressed manually to release the flexible element. With the flexible element thus released the fisherman may then slide the handle forwardly along the flexible element to dispose the dip net at arms length for use. When it is desired to allow the net to depend from the fisherman's body, the gripping element will be first depressed to produce sufficient slack in the flexible element in proximity to its point of attachment 13, as will allow the net to be suspended at such height as to prevent its becoming entangled with brush and other obstacles that may be in the path of the fisherman.

What is claimed is:—

1. In combination a dip net, a flexible element slidably connected with the handle thereof and forming a body embracing loop at the rear end of the handle, and manually releasable means normally engaging the flexible element to hold the handle against movement relative thereto but operable to permit the handle to be moved longitudinally with respect to the flexible element.

2. In combination a dip net, a flexible element slidably connected with the handle thereof and forming a body embracing loop at the rear end of the handle, and a depressible resiliently urged gripping element carried by the handle and normally gripping the flexible element to hold the handle against relative movement with respect to the flexible element, and vice versa.

3. In combination a dip net, a flexible element with which the handle of the dip net is slidably connected and having one terminal secured to the handle to provide a body embracing loop for suspending the dip net when not in use, the opposite end of the flexible element being secured and normally slacked, and means normally engaging the flexible element to maintain such slack therein but operable to permit the dip net to be advanced on the flexible element to operative position for use.

4. In combination a dip net, a flexible element with which the handle of the dip net is slidably connected and having one terminal secured to the handle to provide a body embracing loop for suspending the dip net when not in use, the opposite end of the flexible element being secured and normally slacked, and a spring pressed gripping element carried by the handle and engaging the flexible element to normally maintain such slack therein and depressible to permit the handle to slide longitudinally on the flexible element to operative position for use.

5. In a device of the character described, a body, a flexible element slidably connected with the body and having one end attached thereto to afford a human body embracing loop and having its opposite end secured to the forward end of the body, and retaining means carried by the body and normally engaging the flexible element to retain the body in selected longitudinally adjusted positions thereon.

6. In a device of the character described, a body, a flexible element slidably connected with the body and having one end attached thereto to afford a human body embracing loop and having its opposite end secured to the forward end of the body, and a depressible spring pressed gripping element normally engaged with the flexible element to hold the body in selected longitudinally adjusted positions on the flexible element.

7. In a device of the character described, a body having a longitudinal bore and further provided with a transverse opening intersecting such bore, a longitudinal element adjustable longitudinally in the bore, and a depressible resiliently urged retaining element slidable in the transverse opening and normally bindingly engaging the longitudinal element to retain it in longitudinal adjusted positions.

8. In a device of the character described, a body having a longitudinal bore and further provided with a transverse opening intersecting such bore, a longitudinal element adjustable longitudinally in the bore, and a depressible resiliently urged retaining element slidably mounted in the transverse opening and having an opening therein through which the longitudinal element passes whereby the latter is bindingly held between the retaining element and the opposed walls of the longitudinal bore.

9. In a device of the character described, a body having a longitudinal bore and further provided with a transverse opening intersecting such bore, a flexible element adjustable longitudinally in the bore, and a depressible resiliently urged retaining element slidably mounted in the transverse opening and having an opening therein through which the flexible element passes whereby the latter is bindingly held between the retaining element and the opposed walls of the longitudinal bore.

10. In a device of the character described, a body having a longitudinal bore through which a flexible element is adapted to pass and further provided with a transverse opening intersecting such bore, a loop slidably mounted in the transverse opening through which the flexible element is adapted to pass, and resilient means normally urging the loop in a direction to cause the flexible element to bind between the loop and opposed walls of the bore whereby to normally retain the body and flexible element against relative longitudinal movement.

11. In a handle attachment, a pair of complementary clamping members for embracing the handle, a longitudinally extending enlargement formed on one of the clamping members and having a longitudinal bore for the reception of a longitudinal element and further provided with a transverse opening, and a depressible resiliently urged gripping element in the transverse opening and adapted to normally engage such longitudinal element to normally hold it against longitudinal movement.

12. In a handle attachment, a sleeve to be received on and secured to a handle, a longitudinally extending enlargement formed on the sleeve and having a longitudinal bore for the reception of a longitudinal element and further provided with a transverse opening, and a depressible resiliently urged gripping element in the transverse opening and adapted to normally engage such longitudinal element to normally hold it against longitudinal movement.

13. In a device of the character described, a handle, a human body embracing loop having one end fixed to the handle, a slidable connection between the loop and handle, and means carried by the handle and normally engaging the loop to retain the handle against slidable movement and operable to permit the handle to be adjusted longitudinally.

14. In a device of the character described a dip net, a body embracing loop with which the handle of the dip net is slidably connected, and means carried by the handle and engaging the loop to retain the handle against longitudinal movement relative to the loop.

ALLAN S. RICHARDSON.